Dec. 8, 1936.  H. T. LAMBERT  2,063,444
BRAKE APPARATUS
Filed March 28, 1935  3 Sheets-Sheet 2

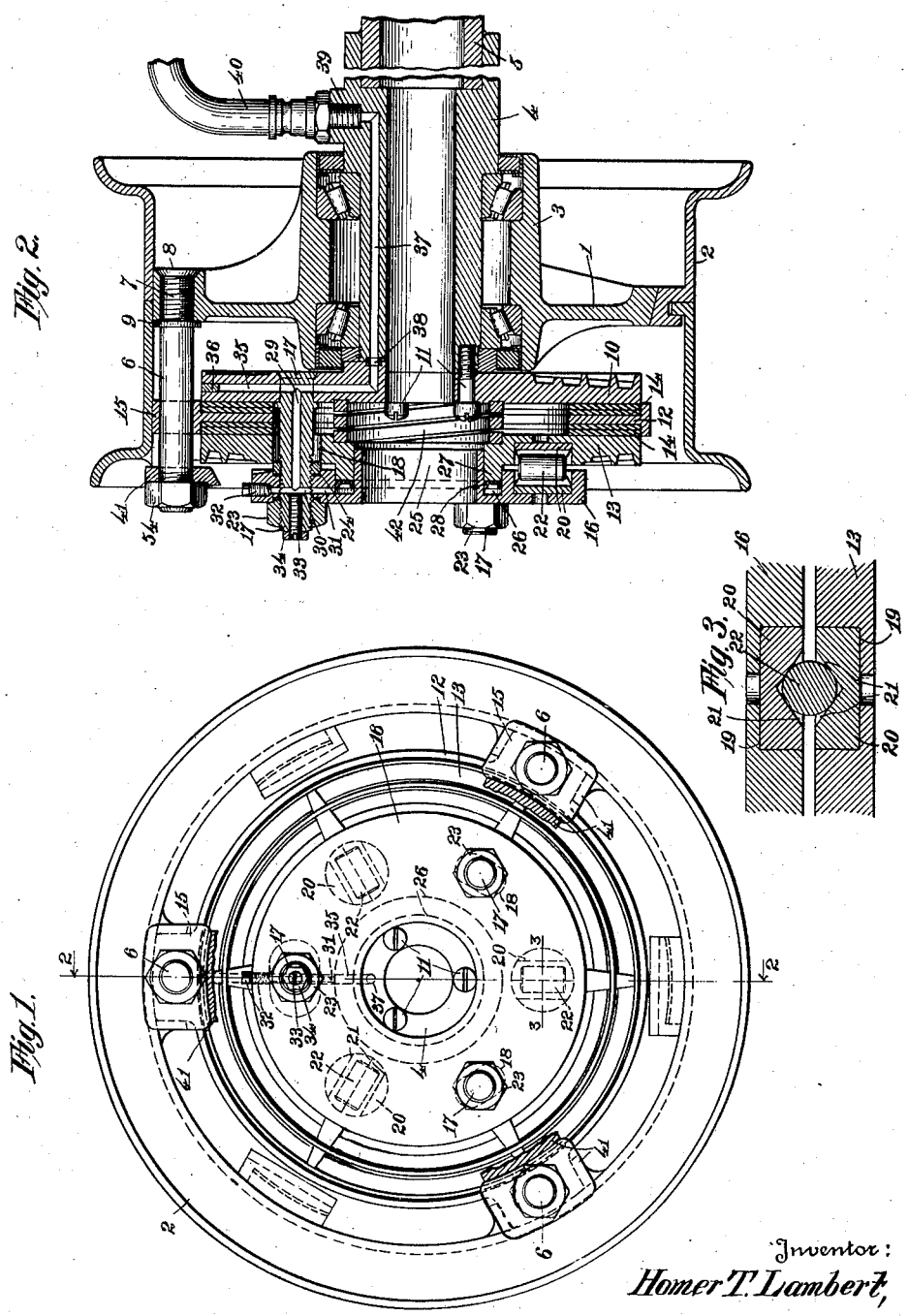

Inventor:
Homer T. Lambert,
By Edgar M. Kitchin,
his Attorney.

Dec. 8, 1936.  H. T. LAMBERT  2,063,444
BRAKE APPARATUS
Filed March 28, 1935   3 Sheets-Sheet 3

Inventor:
Homer T. Lambert,
By Edgar M. Kitchin,
his Attorney.

Patented Dec. 8, 1936

2,063,444

UNITED STATES PATENT OFFICE 2,063,444

BRAKE APPARATUS

Homer T. Lambert, St. Joseph, Mich.

Application March 28, 1935, Serial No. 13,555

15 Claims. (Cl. 188—72)

This invention relates to improvements in brake mechanism of the type popularly employed on vehicle wheels, such as automobile wheels, and more particularly to the type wherein a prime actuator imparts an initial braking thrust that results in an accentuated braking thrust under the momentum or force of rotation of the wheel.

An essential object in view is the provision of means enabling employment of hydraulic medium for imparting the initial thrust, and a further object is the avoidance of leakage of the hydraulic medium.

A more detailed object is the provision for facility of access for charging or draining the conduits for the hydraulic medium.

Another object in view is the impartation of an initial thrust having its stress uniformly distributed throughout the braking part subjected to the thrust.

A further object is the impartation of an initial thrust to a braking part sufficient for certain braking purposes where the supplemental or power braking thrust is not caused to function in the absence of sufficient traction.

With these and other objects in view as will in part hereinafter become apparent and in part be stated, the invention comprises certain novel constructions, combinations, and arrangements of parts as will be hereinafter pointed out and subsequently claimed.

More specifically, the invention includes means for hydraulically actuating a braking part or plate as the initial braking stroke thereof, and the invention further includes means for distributing the stress of such initial stroke uniformly throughout the braking part.

In greater detail, the invention includes, in combination with a braking plate or part, a cylinder and piston, and means for supplying the cylinder with hydraulic medium under pressure for thrusting the piston, the piston engaging the braking part for imparting the initial thrust thereto.

The invention still further includes such a structural arrangement wherein the piston and cylinder are annular.

In still greater detail, the invention includes in such a mechanism as just mentioned flexible means in the cylinder and engaging the piston for preventing leakage therebetween, and the invention still further includes as such flexible means a gasket having circumferential, marginal skirts engaging the walls of the cylinder and facing in the direction of inflow of the hydraulic medium.

In the accompanying drawings,—

Figure 1 is a front elevation of a wheel structure embodying the features of the present invention, the power spider being broken away and parts seen in fragmentary section.

Figure 2 is a vertical section therethrough substantially taken on the line 2—2 of Figure 1 in the plane of the axis of rotation thereof, parts being seen in elevation.

Figure 3 is an enlarged, detailed, fragmentary section taken on the plane indicated by line 3—3 of Figure 1, and showing one of the energizing rollers.

Figure 5:
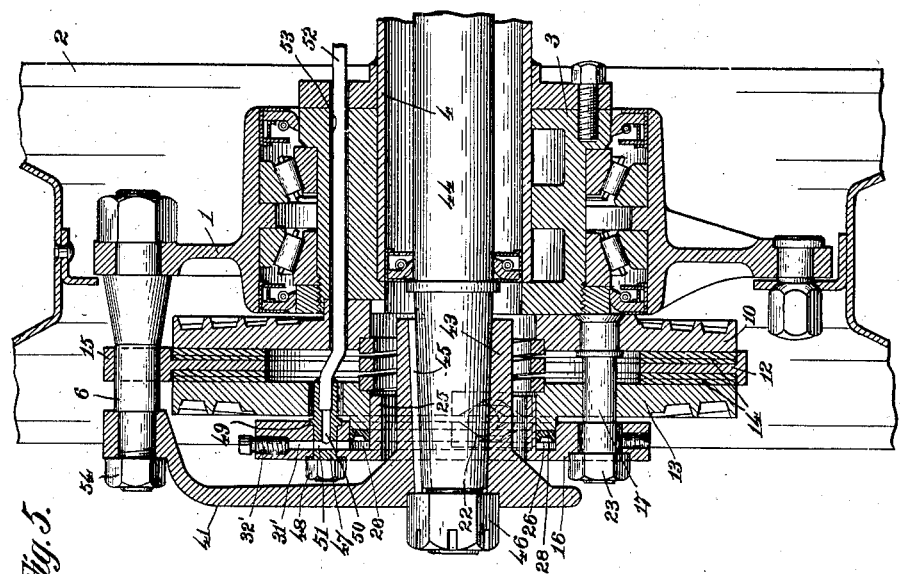
Figures 4 and 5 are respectively views similar to Figures 1 and 2 of a somewhat modified embodiment of the invention, the power spider being seen.

Referring to the drawings by numerals, 1 indicates a wheel carrying any well known or appropriate demountable rim 2 and having a hub 3 journaled on the hub portion 4 of the dead axle or tubular axle 5.

Outstanding axially from and effectively fixed to the wheel 1 are guide and power pins 6. The pins 6 may, of course, be fixed to wheel 1 by any of various methods, one desirable means of anchorage consisting of a threaded portion 7 on the pin 6 threaded through the wheel 1 and then swaged up at the inner face of the wheel to form a head 8. Outward of the wheel 1 a circumferential flange 9 is preferably formed integral with the pin 6 and outstands to abut against the face of the wheel 1.

Fixed to the outer end of the hub portion 4 is a stationary braking plate or disc 10, and the means of anchorage of the plate 10 to the hub 4 may, of course, be varied, one appropriate form consisting of bolts 11 extending from the outer face of plate 10 through the plate and threaded axially into the hub 4. Outward of plate 10 is arranged the rotary braking disc or ring 12, and outward of the said ring 12 is located the outer braking disc 13. Between the disc 10 and ring 12, and between ring 12 and disc 13, are arranged the usual or any appropriate brake linings 14 for taking up wear and facilitating replacement.

While each of the parts 10, 12, and 13 is frequently popularly referred to as a disc, each is in fact an annulus.

The ring or disc 12 is fixed to rotate with the wheel 1, but arranged to slide in an axial direction to adjust itself relative to the two brake discs 10 and 13, and, to this end, the ring 12 is provided with outstanding lugs 15 each provided with an aperture accommodating the passage of a pin 6, so that each lug 15 forms a guide ring slidingly mounted on the respective pin 6, whereby the ring 12 is carried with the wheel 1 during rotation, but is left free to have its sliding movement.

The disc 13 is free to move axially, but is held against any substantial angular or rotative movement, though left free for a slight angular movement for enabling it to receive a power delivered braking thrust after the manner taught by the invention set forth in my co-pending application Serial No. 716,401, filed March 19, 1934. Outward of the outer face of disc 13 is located an annular energizing or power plate 16 which is fixed against outward axial movement and against circumferential movement, preferably after the manner taught in my said co-pending application. To accomplish the mounting of the parts as stated, axially outstanding bolts 17, 17 are fixed to the disc 10, and project through the disc 13 and are anchored to the plate 16, or at least so connected as to preclude axial outward movement of the plate. The method of anchorage of bolts 17 to disc 10 is, of course, susceptible of a wide range of variation, but preferably consists of substantially the same form of connection as provided for the pins 6 in their anchorage to wheel 1. The disc 13 is formed with an arcuate slot or elongated hole 18 for each of the bolts 17 through which the respective bolt extends, the slot being of the width of the respective bolt but of a length sufficient to allow the disc 13 to move angularly for a short distance. A few degrees of such movement is ample for the impartation of the power thrust which is accomplished by the moving of wedging members between the disc 13 and the plate 16 incident to the angular movement of the disc 13. A specific embodiment of the construction and arrangement for such wedging members is seen in my co-pending application executed and filed on even dates herewith and shown in enlarged detail in Figure 3 of the accompanying drawings. Each of the parts 13 and 16 is provided with a series of recesses 19 circular in cross section and of a depth to snugly receive and accommodate a disc 20. Each disc 20 is preferably of hardened material, such as hardened tool steel, or case-hardened steel, and each is provided with a groove 21 facing the corresponding groove of the other disc, the discs being arranged in opposing pairs in the sockets or recesses 19, whereby a space is provided for the accommodation of a roller 22 between the discs within the said grooves. Thus, the rollers 22 rest against inclined faces of grooves 21, and are adapted to ride along said faces when the disc 13 is shifted angularly. Hence with such angular shifting of the disc or brake plate 13 the rollers 22 act as wedges to relatively spread or push apart the parts 13 and 16 with respect to each other, and since the part 16 is held against outward movement, the brake disc 13 is thereby thrust inward under the wedging power of the rollers 22.

The elongated holes 18 for the bolts 17 are of a length and location (that is extend on an arc struck from the axis of angular movement of disc 13) to permit the slight anguluar shifting of disc 13 to effect the said wedging or power thrust, and each of said slots is of a width approximately equal or slightly greater than the width of the bolt which passes through it so as to preclude tendency toward transverse axial play or canting on the part of the disc 13, while allowing the disc entire freedom for its angular shifting or partial rotative movement.

The outer end of each bolt 17 is engaged by a nut 23 which is threaded to contact with the outer face of and serves to prevent outward movement of the energizing or power plate 16. Ordinarily, it would not be essential that the plate 16 be held against inward movement, since all of the stresses to which that plate is subjected are outward, but because of the desirability to maintain alinement of ports, as hereinafter described, it is preferable to provide at least one of the bolts 17 with a nut 24 threaded onto the bolt to a position to contact with the inner face of plate 16. Each of the bolts 17 may be provided with such a nut, but ordinarily one nut 24 will serve sufficiently for the intended purpose. In assembling the parts, the nut 24 is first applied and then the plate 13 placed on the several bolts 17, and then nuts 23 applied and screwed up to the place where the plate 16 is clamped firmly against the nut 24. The nut 24 may be, as seen in Figure 2, provided with a cushioning gasket 24' at its outer face to render more effective a firm seating of plate 16. Where the nut 24 is applied, the elongated hole 18 is preferably proportionally enlarged in width and length to accommodate the nut and permit play of the plate angularly notwithstanding the presence of the nut.

Plate 16 is preferably provided with an integral, inwardly-extending, sleeve-like collar or annular boss 25 concentric to the live axle which it surrounds, but which is omitted from Figure 2. The collar 25 extends inward and is telescoped into the braking disc 13, the bore or central opening of which disc is proportioned to snugly receive the collar 25 for allowing lateral shifting and angular movement on the collar, but the contact is otherwise as close as practicable, such as is produced by the formation of a ground joint connection. This is for the purpose of preventing leakage, as will become apparent. The collar 25 may, of course, be otherwise formed and otherwise fixed to the plate 16 than by being formed integral. The plate 16 immediately outward of the collar 25 is formed with a circumferential groove 26, the walls of which includes a part of the collar 25 and which constitutes an annular cylinder into which projects an outstanding, annular boss 27 from the outer face of the disc 13, the said boss 27 thus constituting an annular piston reciprocal within the groove or cylinder 26. Within said groove or cylinder outward of and in face contact with the outer face of piston 27 is a sealing gasket 28. The said gasket 28 may be anchored to the contacting face of piston 27 in any appropriate manner, as by being cemented thereto. The gasket is of flexible material, preferably flexible rubber, and, as seen in Figure 2, is preferably channel shaped with the channel opening outward so that the margins of the gasket are flanged outwardly with the flanges resting against the side walls of the cylinder 26. The said gasket thus effectively seals the joint between the said cylinder and the piston 27 and prevents leakage therebetween. One of the bolts 17, preferably the uppermost one, and at least one that is provided with a nut 24, is formed with a longitudinal port 29 and a transverse port 30 extending across and communicating with the port 29. The plate 16 is also formed with a port 31 leading into the groove or cylinder 26 at one end and at an intermediate point communicating with the port 30. The outer or upper end portion of the port 31 opens through the periphery of the plate 16, and is enlarged and threaded to receive a threaded plug 32 for closing and sealing the port. The port 29 extends to the outer end of the bolt 17 and has its outer end portion outward of port 30 enlarged and threaded and closed and sealed by a threaded plug 33. A lock nut or other like safety device 34 engages the outer end portion of the threaded plug 33 for jambing the parts and preventing accidental or undesired loosening or backing off of the plug 33. Plug 32 may be similarly, or in any preferred manner, locked against accidental loosening. The plate or disc 10 is formed with a radial port 35 intersecting and communicating with port 29, and the outer end portion of port 35 is preferably sealed with any appropriate plug 36. The inner end portion of port 35 is preferably turned abruptly at an angle to open through the inner face of disc 10 and there communicates with a port 37 extending in an axial direction along and within the hub 4. The meeting ends of the ports 35 and 37 are sealed in communication with each other and against lateral leakage at the joint between hub 4 and disc 10 by a gasket 38 preferably seated in appropriate rabbets formed in the respective contacting parts. The inner end portion of the port 37 is upturned and extends radially through the hub 4 to the outer surface thereof and is enlarged and threaded and engaged by a threaded tubular nipple 39 carrying a hydraulic medium supply tube 40. The tube 40 may lead from any appropriate source of supply, such as the customary master cylinder whose hydraulic medium supply is projected by a stroke commonly effected by movement of a pedal. Of course, the source and means of forcing the hydraulic medium through the tube 40 may be varied without in any sense varying the construction and operation of the parts comprising the present invention. It will be particularly noted that all of the ports 29, 31, 35, and 37 are so located in the respective parts in which they appear that they can be readily produced by a boring operation before the parts are assembled.

Details of the operation of the discs 20 and the cooperation of the rollers 22 with respect thereto, whereby cylindrical rollers are effectively employed as distinguished from tapered or conical rollers, is set forth in my above-mentioned co-pending application filed even date herewith.

Also, it will be readily understood that a live axle extends through the dead axle 5 and hub 4, and is connected by a spider 41 to the pins 6, the major portion of the spider being omitted and only fragments thereof being seen in Figures 1 and 2. Nuts 54 on pins 6 retain the spider 41 in engagement with the wheel 1. A complete spider of this type is disclosed in Figures 4 and 5 of the accompanying drawings.

It will be understood, of course, that an axial, inward thrust of disc 13 causes the disc to have a braking contact with the disc or ring 12, and causes the said disc or ring 12 to shift to braking contact with the braking disc 10, and when the disc 13 is released the parts move apart to a non-braking relation. To insure such movement, a coiled spring 42 is interposed between discs 10 and 13 and tensioned to spread the discs so that the disc 13 is moved outward away from braking contact whenever freed. The operation may be briefly stated as follows:

If the parts are not in motion and an impulse is imparted to the hydraulic medium with which the tube 40 and ports 37, 35, 29, and 31 and cylinder 26 are filled tending to crowd more of such medium into the cylinder 26, the piston 27 is caused thereby to move inward, and the disc 13 caused to have a braking engagement with the brake ring 12. Under some circumstances, this braking action is all that is desired or required. Where the parts are in motion and the traction of the wheel 1 is normal, or approximately so, and such an impulse is imparted to the hydraulic medium, the lateral thrust or initial movement of the disc 13 in causing braking action also causes the disc to be picked up incident to the rotative movement of the brake ring 12 and moved angularly therewith within the limits of the slots 18. A very slight angular movement of this kind is all that is required to cause the rollers 22 to ride along the relatively opposed inclined faces of discs 20 and to thereby crowd or thrust the disc 13 inward with a power stroke increasing the braking action in proportion to the extent to which the disc 13 is thus thrust inward. Of course, the impulse and stress on the hydraulic medium in the cylinder 26 must be continued and maintained to maintain the power stroke. When it is no longer desired to effect the braking action, release of the stress on the said hydraulic medium will enable the spring 42 to thrust the disc 13 outward and thus cause such separation of ring 12 from the disc 13 and from the disc 10 as relieves all braking action. Of course, this return movement is accompanied by a proportional return movement of the hydraulic medium to the master cylinder or other source of supply.

Figure 4:
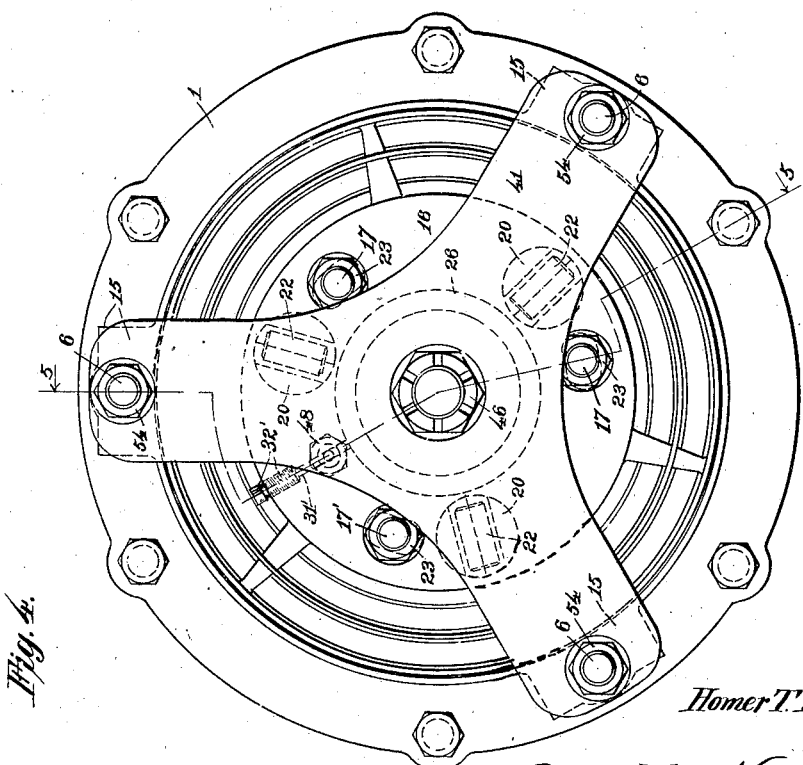

In Figures 4 and 5 is illustrated the same details of construction as shown in Figures 1, 2, and 3 and described above with the exception of the method of mounting the demountable rim which is not material, and the further exception that the hydraulic medium delivery means is modified. Accordingly, the same reference numerals have been applied as far as applicable and the same description will apply to Figures 4 and 5. It will be seen in these figures that the spider 41 is provided with a sleeve 43 cone-fitted onto the hub of the live axle 44 and keyed thereto by an appropriate key 45, and also secured by the retaining nut 46 threaded onto the outer end of said live axle. The several bolts 17 in the embodiment seen in Figures 4 and 5 are employed solely for their function with respect to the power plate or energizing disc 16, and the hydraulic medium delivery means is arranged independently thereof. A port 31' is formed radially of and in the disc 16 and is at its outer end closed by a threaded plug 32', the inner end communicating with the cylinder 26. A tubular pin 47 extends transversely through the energizing plate or power disc 16 and is clamped in place by a nut 48 threaded onto the outer end of the pin, the pin being provided at an intermediate portion with a circumferential flange 49 seated against the inner face of the plate 16, whereby the pin 47 is clamped in position in its engagement with the plate to seal the fluid therein. A port 50 is formed axially of the pin 47 and opens at the inner end of the pin, and also opens at its outer end in communication with a cross port 51 which is interposed in the length of and in communication with the port 31'. A preferably metal tube 52, such, for instance, as copper, extends into the inner end portion of the pin 47 and is welded, sweated, or otherwise effectively anchored therein both for fixing the parts together and for precluding leakage therebetween. The tube 52, of course, is sufficiently flexible to be bent as required for introduction and accommodation of adjacent parts. The hub of the wheel and the inner disc 10 are formed with a continuous passageway 53 for accommodating the tube 52.

The operation of the parts is the same as that above described, the difference in structural details above stated being the difference between the embodiment of the invention as seen in Figures 4 and 5 and that seen in Figures 1, 2, and 3. Other slight modification of detail in structural formation, such as the type of hub for the dead axle 4 and the contour of the pins 6, is not considered a variation since not directly related to or modifying the structure or operation of the combination incorporating the invention.

Figure 6:
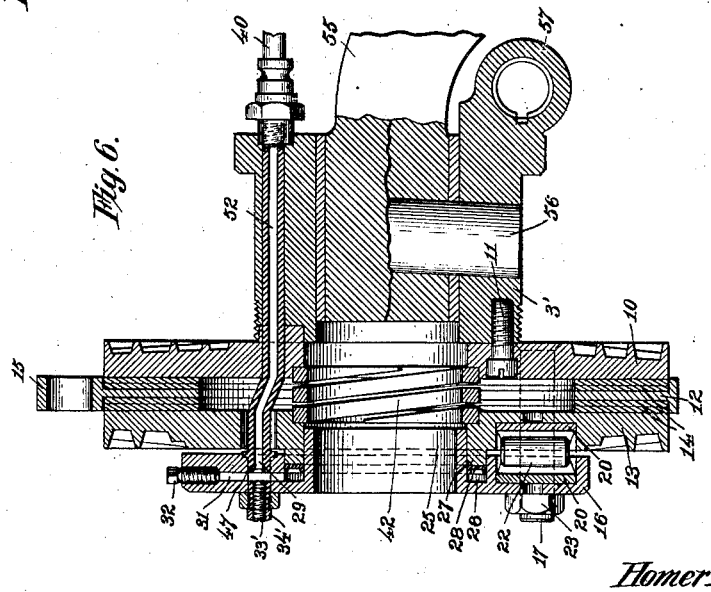
Figure 6 is a vertical section through a brake mechanism incorporating a further slightly modified embodiment and shown applied to the hub of a dirigible wheel such as the front wheel of an automobile, a fragment of the front axle being seen partly in section and partly in elevation.

In Figure 6 is seen practically the same identical structure, so far as the present invention is concerned, as that seen in Figures 4 and 5, but the invention is shown as applied to a dirigible wheel, such as the front wheel of an automobile, where the solid axle 55 is swivelled at 56 to the hub 3' having the steering link connection eye 57. The parts being otherwise the same as those described with respect to Figure 5, the same reference numerals have been applied and the same description equally applies, except that the pin 47 clamped to the power plate 16 is shown as integral and continuous of the tube 52, which is not considered a departure from the structural formation where the parts are welded together, as seen in Figure 1. Also, it should be understood that while the pin 47 is not shown with a longitudinal port extending entirely to the outer end, the port may be so extended, as seen in Figure 6, and a removably threaded plug 33' locked by a nut 34' may be provided to correspond with the similar structure in Figure 2. It will be readily understood that the plugs 33 or 33' and the plug 32 are removable for cleanout purposes and for draining or charging additional hydraulic medium into the system when and as desired.

Figure 7:
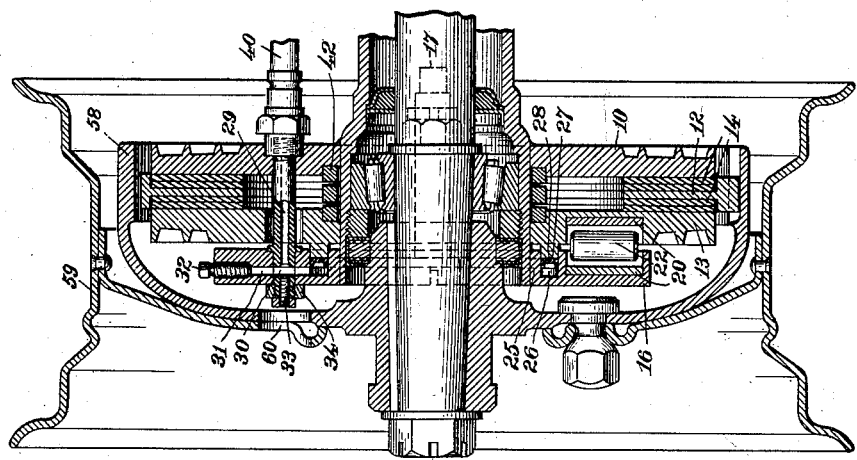
Figure 7 is a view similar to Figure 2 of another embodiment of the invention shown applied to the inner face of the wheel.

In Figure 7 is seen the same embodiment of the invention as illustrated in Figure 2 except that it is applied to a slightly different type of wheel and arranged at the inner face of the wheel instead of at the outer face thereof, so that in lieu of the guiding pins 6 a brake drum 58 slidingly carries the rotative brake ring substantially after the manner shown in Figures 1 to 4 inclusive of my co-pending application Serial No. 716,401, reference to which is made for details of the wheel construction and mounting of the brake ring on the drum. The said drum 58 constitutes the main body of the wheel to which the rim 59 is demountably connected after the manner set forth in my last-named co-pending application. The drum and anchoring flange portion of the rim are apertured at 60 to afford ready access to the threaded plug 33. The balance of the parts of the structure embodying the invention as seen in Figure 7, being identically the same as those shown and described with reference to Figure 2, the same description is applicable and the same reference numerals have been applied to Figure 7.

What is claimed is:

1. In brake mechanism, the combination of a movable brake part, a stationary part, one of said parts having an annular boss constituting a piston and the other of said parts having an annular recess in which said piston is received constituting a cylinder, means for introducing hydraulic medium under pressure therebetween for delivering pressure uniformly directly to and throughout the brake part exerted in a direction for moving the brake part for a braking application thereof, and mechanical means cooperating with the parts aforesaid for imparting additional braking pressure initiated by said hydraulic means.

2. The combination as claimed in claim 1 wherein the braking part is a brake disc movable axially and rotatively and the pressure delivering means includes a conduit leading to the cylinder and disposed so as to deliver an axial thrust to said brake part with the pressure distributed uniformly throughout a circle concentric to the periphery of the disc.

3. In brake mechanism, the combination of a brake disc, a stationary energizing plate, said disc and plate having overlapping interengaging parts whereby one of said parts is mounted for movement upon the other, means between said plate and disc for imparting a power thrust axially and rotatively to said disc incident to an initial movement of the disc, and hydraulic means for imparting the said initial movement to the disc.

4. The combination as claimed in claim 3 wherein the hydraulic means includes a cylinder and piston, one carried by the disc and the other by the plate, and means for delivering hydraulic medium under pressure to the piston for imparting the initial movement to the disc.

5. In brake mechanism, the combination of an axially and rotatively movable braking disc having a central passageway, an energizing plate relatively fixed and having a disc supporting collar extending into and slidingly engaged by the surface of the passageway of the disc, means coacting with the braking disc and energizing plate for effecting rotative movement of the disc and hydraulic means acting along said collar against said disc and reacting against said plate for controlling the braking movement of the disc by said last-named means.

6. The combination as claimed in claim 5 with means sealing the joint between the collar and the engaged portions of the disc for precluding leakage therebetween during rotary and axial movement of the disc.

7. The combination as claimed in claim 5 with a gasket surrounding the collar and engaged by the disc for preventing leakage between the disc and collar.

8. The combination as claimed in claim 5 wherein the energizing plate is formed with a groove outward of the collar to provide an annular cylinder to receive the hydraulic medium, and the disc is provided with an annular projection extending into and fitting between the walls of the groove.

9. In brake mechanism, the combination of a brake disc movable laterally and angularly, a relatively fixed energizing plate on which the disc is freely mounted for lateral and angular movements, and means interposed between the plate and disc for imparting a power braking thrust to the disc incident to angular movement of the disc, and hydraulic means for imparting an initial braking movement to said disc.

10. In brake mechanism, the combination of a rotative brake ring, a braking disc movable laterally into and out of braking contact with said ring and adapted to be moved angularly with the ring incident to an initial braking movement of said disc into engagement with the ring, and a relatively fixed energizing plate cooperating with the disc and having supporting means extending therefrom on which the disc is freely mounted, of means between the disc and plate for imparting a power braking thrust to the disc incident to angular movement of the disc, and hydraulic means acting between the plate and disc for imparting the initial braking movement to the disc.

11. In brake mechanism, the combination of a movable brake part, a stationary part, means for introducing hydraulic medium under pressure therebetween for delivering pressure uniformly directly to and throughout the brake part exerted in a direction for moving the brake part for a braking application thereof, said pressure delivering means comprising an annular cylinder and an annular piston operating therein, and mechanical means cooperating with the parts aforesaid for imparting additional braking pressure initiated by said hydraulic means, said mechanical means including uniformly spaced rollers and camming surfaces.

12. In brake mechanism, the combination of a movable brake part, a stationary part, means for introducing hydraulic medium under pressure therebetween for delivering pressure uniformly directly to and throughout the brake part exerted in a direction for moving the brake part for a braking application thereof, said pressure delivering means comprising an annular cylinder, an annular piston operating therein, and an annular gasket engaging the end of the piston and bridging the space of the cylinder, and mechanical means cooperating with the parts aforesaid for imparting additional braking pressure initiated by said hydraulic means.

13. In brake mechanism, the combination of a movable brake part, a stationary part, means for introducing hydraulic medium under pressure therebetween for delivering pressure uniformly directly to and throughout the brake part exerted in a direction for moving the brake part for a braking application thereof, said pressure delivering means comprising an annular cylinder, an annular piston operating therein, and an annular gasket engaging the end of the piston and bridging the space of the cylinder, said gasket being channel-shaped with the channel opening away from the piston, and mechanical means cooperating with the parts aforesaid for imparting additional braking pressure initiated by said hydraulic means.

14. In brake mechanism, the combination of a movable brake part, a stationary part, means for introducing hydraulic medium under pressure therebetween for delivering pressure uniformly directly to and throughout the brake part exerted in a direction for moving the brake part for a braking application thereof, said pressure delivering means comprising an annular cylinder, an annular piston operating therein, and an annular gasket engaging the end of the piston and bridging the space of the cylinder, said gasket being formed of elastic material and being channel-shaped with the channel facing away from the piston, and mechanical means cooperating with the parts aforesaid for imparting additional braking pressure initiated by said hydraulic means.

15. In brake mechanism, the combination of a movable brake part, a stationary part, means for introducing hydraulic medium under pressure therebetween for delivering pressure uniformly directly to and throughout the brake part exerted in a direction for moving the brake part for a braking application thereof, said pressure delivering means comprising an annular cylinder, an annular piston operating therein, an annular gasket engaging the end of the piston and bridging the space of the cylinder, said gasket being formed of elastic material and being channel-shaped with the sides of the channel facing away from the piston and providing flanges engaging the side walls of the cylinder, and mechanical means cooperating with the parts aforesaid for imparting additional braking pressure initiated by said hydraulic means.

HOMER T. LAMBERT.